(No Model.)
E. E. REED.
DEVICE FOR FASTENING PAD SCREWS, &c., IN HARNESS.
No. 444,711. Patented Jan. 13, 1891.
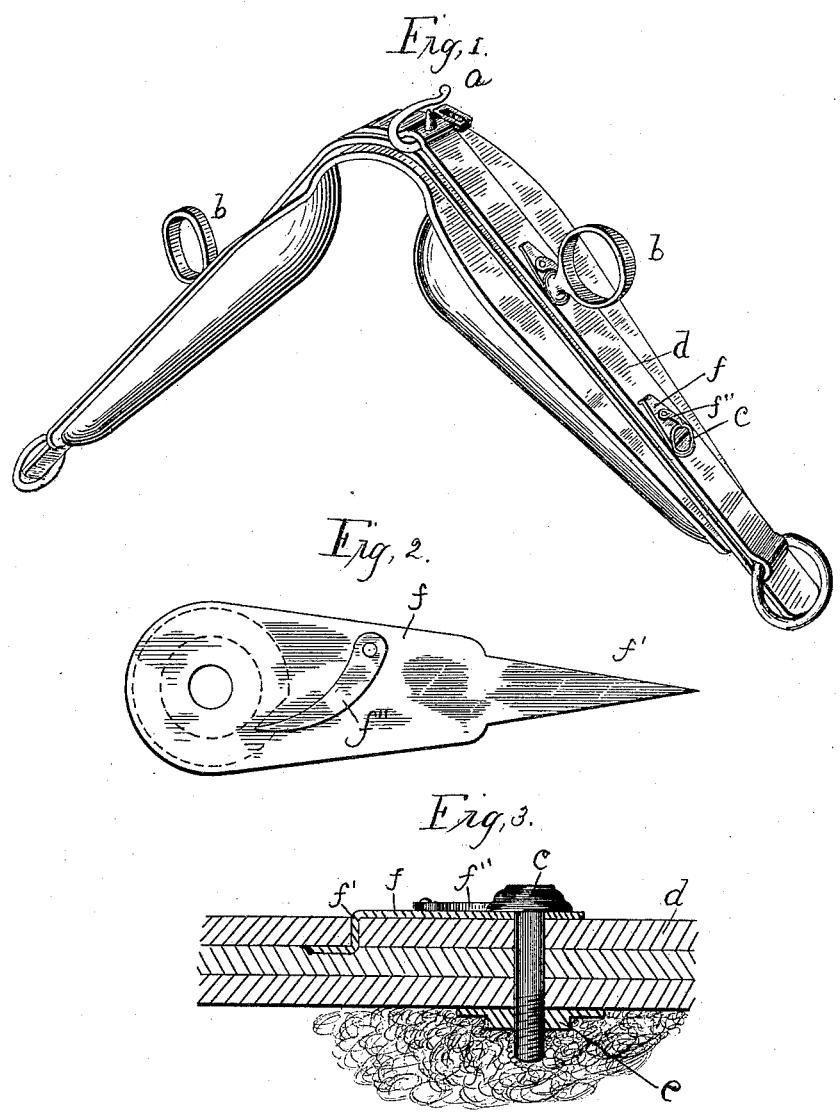

UNITED STATES PATENT OFFICE.

ELSWORTH E. REED, OF TAYLORVILLE, ILLINOIS.

DEVICE FOR FASTENING PAD-SCREWS, &c., IN HARNESS.

SPECIFICATION forming part of Letters Patent No. 444,711, dated January 13, 1891.

Application filed October 22, 1890. Serial No. 368,924. (No model.)

*To all whom it may concern:*

Be it known that I, ELSWORTH E. REED, a citizen of the United States, residing at Taylorville, in the county of Christian and State of Illinois, have invented certain new and useful Improvements in Devices for Fastening the Pad-Screws, Terrets, and other Screws of Harness-Pads in Place, of which the following is a specification, reference being had therein to the accompanying drawings.

Figure 1 represents a perspective view of a harness-pad provided with my improved device; Fig. 2, a detail plan view of the device; Fig. 3, a detail sectional view of a portion of the pad, showing the application of the device.

In the ordinary pads now in use one difficulty or drawback is that the movement of the animals upon which they are placed soon loosens the screw-bolts connecting their parts together, thereby permitting the bolts to fall out and the parts of the pads to become loose and unserviceable. It is the object of this invention to overcome this defect and provide simple means whereby the connecting bolts or screws are prevented from turning when once screwed home, as will more fully hereinafter appear.

The pad shown in the drawings is of the usual construction, and is provided with the usual checkrein-hook $a$, terrets $b\ b$, and connecting-bolts $c$. The terret-screws and connecting bolts or screws, as usual, are passed through the pad layers or straps $d$ and have tapped upon their ends suitable nuts $e$, secured within the pads. The heads of the bolts $c$ are each, as usual, provided with a groove for the reception of a screw-driver. Clamped between the head of each of the bolts and terrets and the pad-layer is a plate of thin malleable metal $f$, provided at one side with a tongue $f'$, which is bent down and inserted and clinched in a slit in the pad-layer and adapted to prevent the plate turning. Pivoted upon each of the plates is a pawl $f''$, adapted to engage a suitable notch formed in the edge of the screw-head or terret-head, and thereby prevent the same turning and becoming loose prematurely. By disengaging the pawls from their notches the screws may be readily unscrewed, as is evident.

Having thus fully described my invention, what I claim is—

1. The combination of a harness-pad, the connecting-bolts and their nuts, plates clamped under the heads of the bolts and provided with tongues to engage the straps of the pad, and pawls pivoted upon the said plates and adapted to engage the heads of the said bolts and prevent them turning, substantially as described.

2. The combination of a harness-pad, the straps thereof, the screw-bolts passed through the straps and pads and having their heads provided with notches, and independent stationary plates clamped to the straps and provided with pawls adapted to engage the notched heads of the screw-bolts and prevent them turning, whereby the said connecting bolts or screws will be prevented from jarring loose while the pad is in use, substantially as described.

In testimony whereof I affix my signature in presence of two witnesses.

ELSWORTH E. REED.

Witnesses:
 FANNIE R. JARBOE,
 CARRIE A. REED.